United States Patent [19]

Staron et al.

[11] Patent Number: 4,718,048
[45] Date of Patent: Jan. 5, 1988

[54] METHOD OF INSTANTANEOUS ACOUSTIC LOGGING WITHIN A WELLBORE

[75] Inventors: Philippe Staron, Mennecy; Georges Arens, Croissy sur Seine; Pierre Gros, Buc, all of France

[73] Assignee: Societe Nationale Elf Aquitaine (Production), Courbevoie, France

[21] Appl. No.: 837,550
[22] PCT Filed: May 20, 1985
[86] PCT No.: PCT/FR85/00119
§ 371 Date: Jan. 22, 1986
§ 102(e) Date: Jan. 22, 1986
[87] PCT Pub. No.: WO85/05696
PCT Pub. Date: Dec. 19, 1985

[30] Foreign Application Priority Data

May 25, 1984 [FR] France ............................. 84 08207

[51] Int. Cl.$^4$ .......................... G01V 1/00; G01V 1/40
[52] U.S. Cl. ........................................ 367/40; 367/41; 181/106
[58] Field of Search ................. 367/40, 82, 41, 86; 166/66; 175/40, 50; 181/106

[56] References Cited

U.S. PATENT DOCUMENTS

| | | |
|---|---|---|
| 2,331,152 | 10/1943 | Willis, Jr. . |
| 2,933,144 | 4/1960 | Scott et al. . |
| 3,676,841 | 7/1972 | Anstey .......................... 367/41 X |
| 3,739,871 | 6/1973 | Bailey . |
| 3,817,345 | 6/1974 | Bailey . |
| 3,979,724 | 9/1976 | Silverman ..................... 175/40 X |
| 4,003,017 | 1/1977 | Bailey . |
| 4,040,003 | 8/1977 | Beynet et al. ................. 181/106 X |
| 4,207,619 | 6/1980 | Klaueness ...................... 367/36 |
| 4,365,311 | 12/1982 | Widrow ....................... 181/106 X |

FOREIGN PATENT DOCUMENTS 1584951 12/1969 France .

OTHER PUBLICATIONS

Katz, L. J., "Drill Bit Location, Guidance by Seismic seen Feasible", *Oil & Gas Journal,* vol. 78, No. 30, Jul. 1980, (Tulsa, OK), pp. 197-200.

Primary Examiner—Thomas H. Tarcza
Assistant Examiner—Tod Swann
Attorney, Agent, or Firm—Schwartz, Jeffery, Schwaab, Mack, Blumenthal & Evans

[57] ABSTRACT

Method of instantaneous acoustic logging within a wellbore.

The method is characterized in that it consists of locating on drill-pipe and ground recordings elementary recordings corresponding to one and the same depth level of the drilling tool, in grouping these elementary recordings in pairs, then in intercorrelating said recordings of the pairs so as to produce in respect of each pair a correlated signal which is representative of the acoustic energy produced and of the difference in travel times of the waves received on sensors from which the pair of recordings has been obtained.

A particular application is for the determination of a seismic wellbore profile.

9 Claims, 10 Drawing Figures

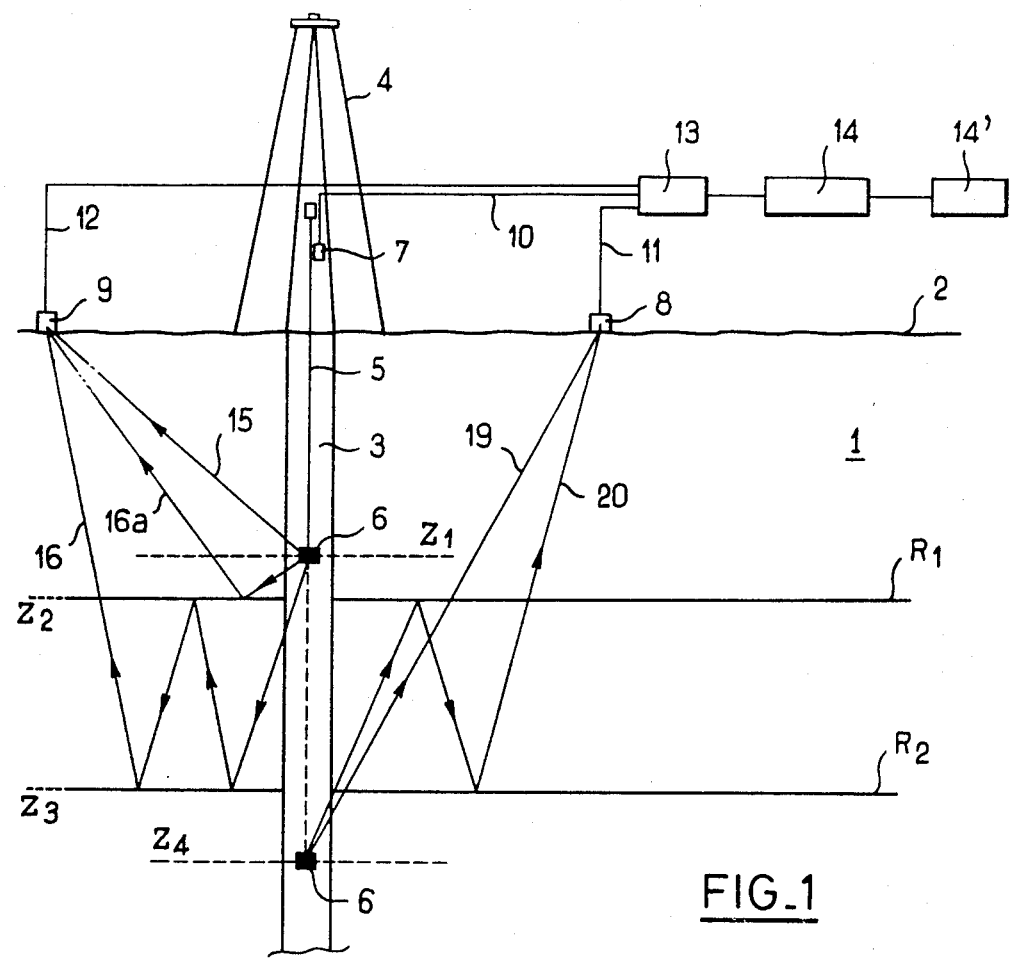
FIG_1
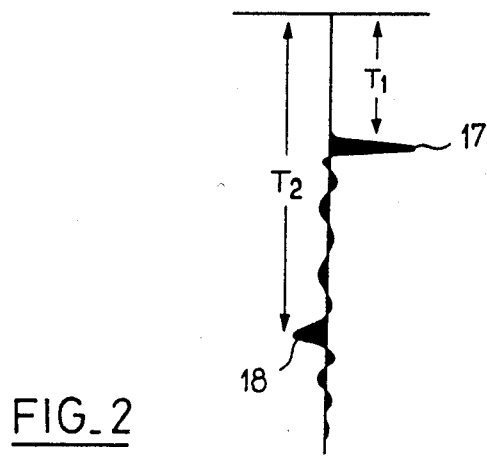
FIG_2

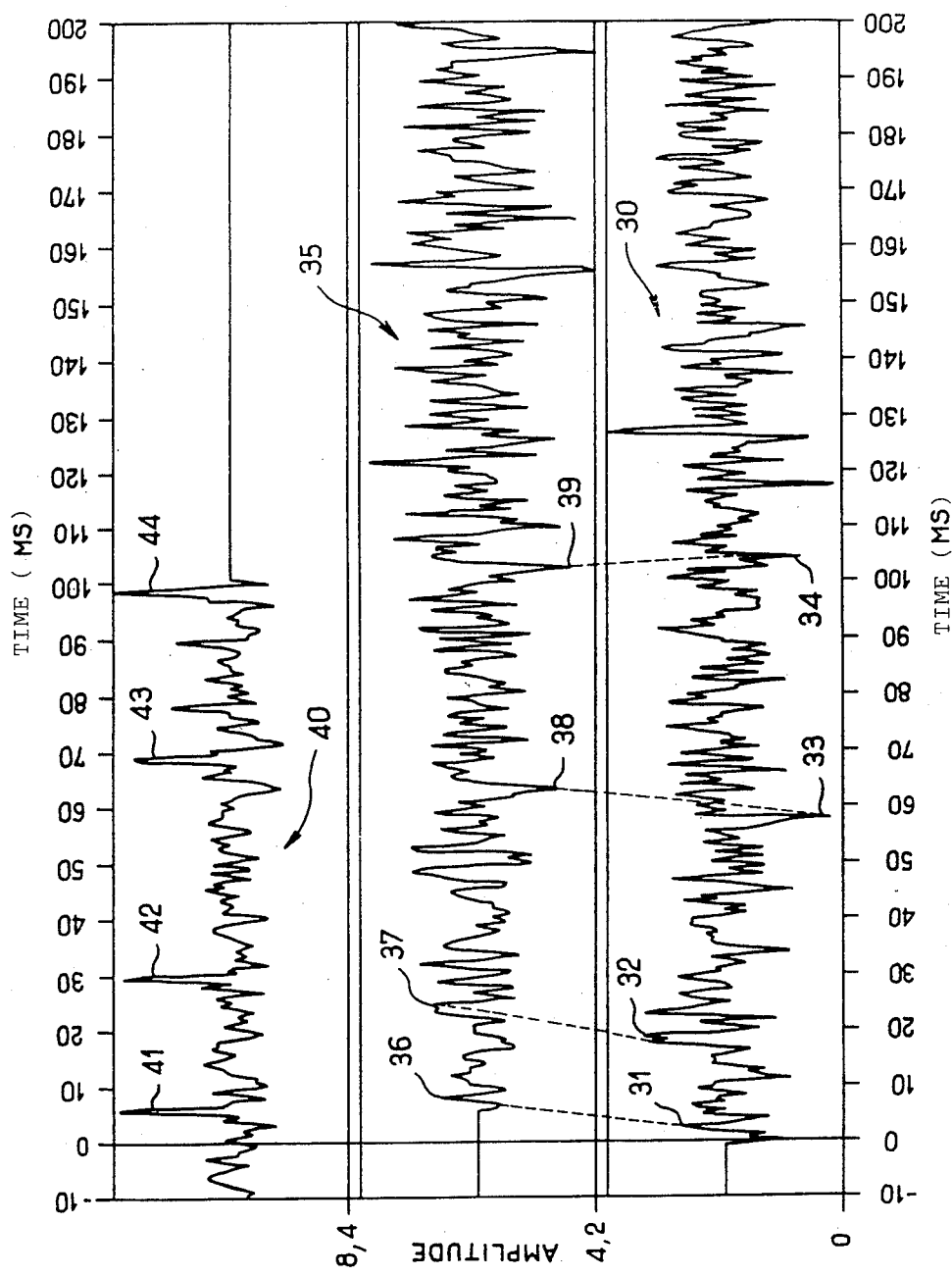

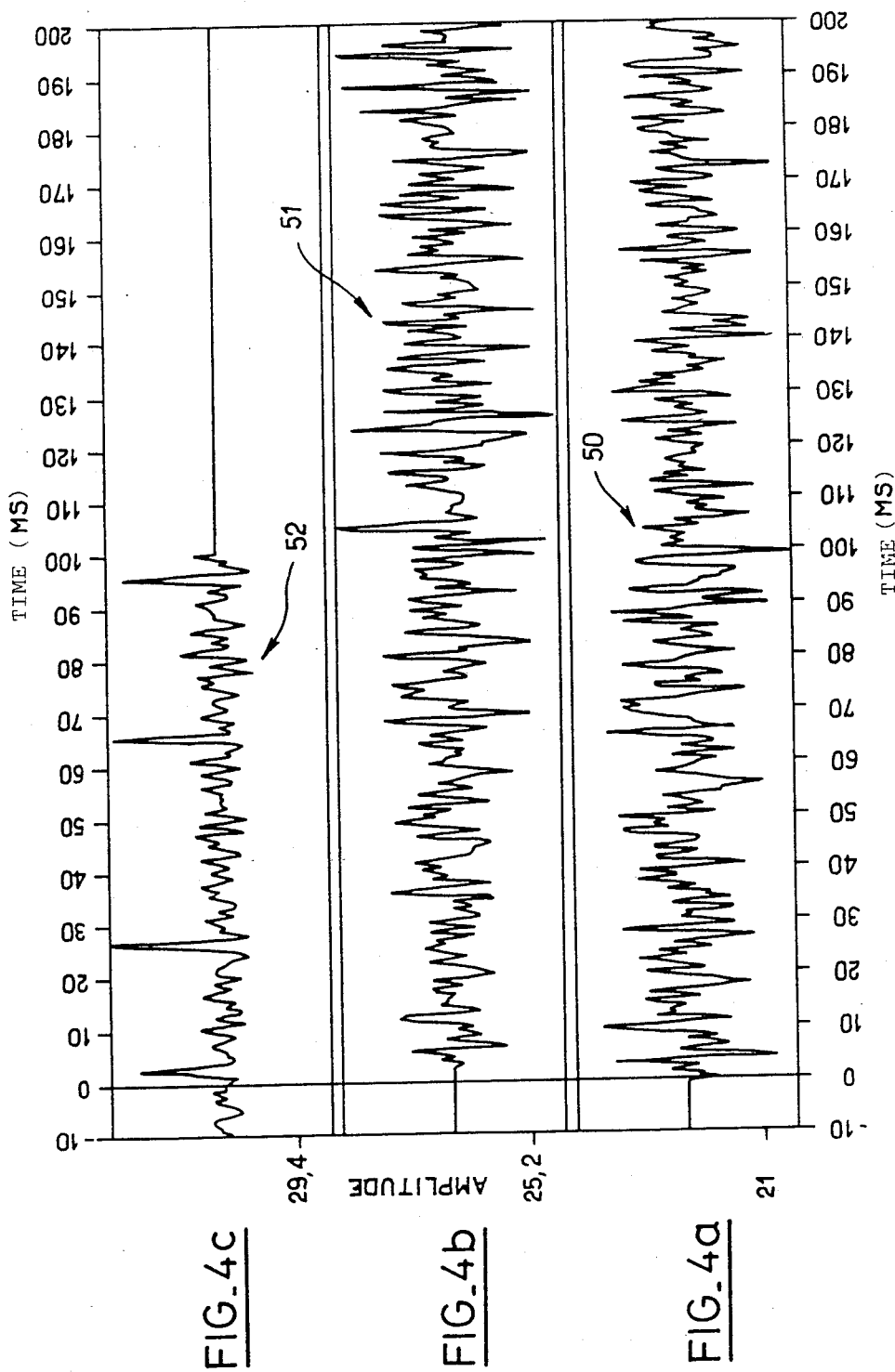

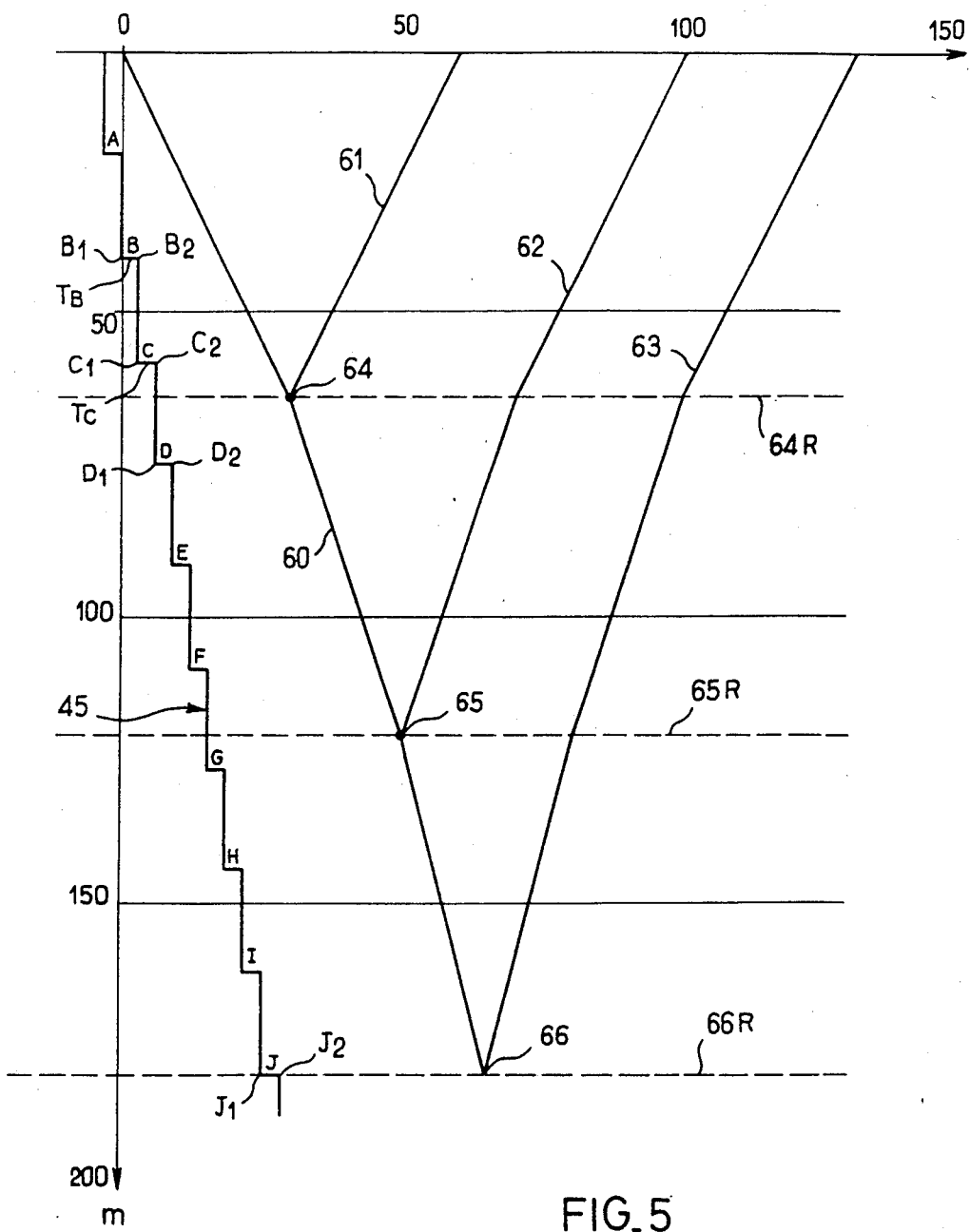
FIG_5

METHOD OF INSTANTANEOUS ACOUSTIC LOGGING WITHIN A WELLBORE

The present invention relates to a method of instantaneous acoustic logging within a wellbore and more generally to a method for continuously measuring the acoustic characteristics of subsurface strata which surround the wellbore.

During well-drilling operations, a certain number of physical measurements known as well logs are made in subsurface strata which are also known as formations and through which a drilling tool passes.

A certain number of well logs are produced while the drilling operation proper is in progress and these are known as instantaneous logs whereas other logs are produced during periods of interruption of drilling operations and these are known as delayed logs.

The well logs thus obtained permit more accurate evaluation of formations traversed by a wellbore in order to achieve better drilling control and to make a direct contribution to exploration of hydrocarbon deposits and the like.

Certain well logs are of the acoustic type, that is to say in which acoustic energy is generated by means of a transmitter and travels through all or part of the formations before reaching the receivers, the received signals being recorded and then processed if necessary, in particular in order to provide the possibility of separating the compressive waves or P waves from the shear waves or S waves.

Among the acoustic logs of primary interest which are worthy of mention are the so-called sonic logs which are recorded only in the delayed mode and logs of the more directly seismic type which produce what is known as a vertical seismic profile or wellbore profile and which are also recorded in the delayed mode.

A sonic log is usually performed by means of a special tool which is lowered into a wellbore, a pulse transmitter (for ultra-short pulses repeated at very short intervals) being provided in the upper portion of said tool and a receiver being provided in its lower portion. The time taken by the wave generated by the pulses to propagate through the adjacent formations and around the borehole is recorded progressively as the tool travels upwards over a layer of constant thickness: an integrator makes it possible to determine the time of travel from the recording time origin.

The vertical seismic profile can be obtained by means of specific tools such as those described in patent applications No. 8 402 895 and No. 8 319 727 filed in the name of the present Applicant.

Although delayed logs are undoubtedly useful even if they entail the need to free the borehole by raising the drilling tool to the surface and replacing it by a logging tool, it is equally useful to produce instantaneous logs if only in order to improve drilling control and to check in real time the characteristics and fluid contents of formations.

Instantaneous well-logging operations which are always performed while drilling is in progress and involve either surface measurements such as, for example, measurement of the differential flow rate of the drilling fluid, of the speed of rotation and/or rate of penetration of the drilling tool, of the hydrocarbon content of the drilling fluid, or hole bottom measurements which are made in the vicinity of the drilling tool and which are raised to the surface by various means including an acoustic transmission in the drilling mud.

In the case of instantaneous logs, it has been proposed to employ as a vibration source, not a specific acoustic transmitter but the drilling tool itself or more precisely its lower end portion which will be designated as a bit for the sake of greater convenience. Roller bits, for example, in fact cut into the bottom working face of a borehole by percussion, the rotation of the cutting roller from one tooth to the next being such as to ensure destruction of the rock.

In French Pat. Nos. 1 587 350, 1 590 327 and its Addition No. 96 617, it is proposed to utilize the vibrational energy which is emitted by the bit and propagates within the drilling tool along the string of drill pipes, whereupon the signal received at the surface at the top portion of the drilling tool is processed in strain and acceleration sensors after recording so as to deduce data relating to the characteristics of the rock being cut by the bit, said data being also utilized for controlling the drilling parameters in dependence on certain mechanical characteristics of the rock being cut.

Data of this type do not alone and directly provide information relating to velocity of propagation of waves within the formations traversed by the drilling tool.

In U.S. Pat. Nos. 3,817,345 and 4,003,017, a device and a method are described for determination of the position of a bit within an inclined wellbore. The device comprises means for producing elastic waves within the formation located around and in proximity to the bottom of the well; a drill-pipe sensor of the accelerometer or velocimeter type placed at the upper end of the string of drill pipes; and ground sensors such as geophones placed at the surface in suitable directions. In U.S. Pat. No. 4,003,017, the elastic waves are produced by dropping the bit into the bottom of the wellbore or by an abrupt separation of said bit from the bottom face of the wellbore.

In U.S. Pat. No. 3,817,345, the elastic waves are produced by dropping of the upper portion of the drill string in order to generate within said drill string a wave which subsequently propagates within the formation surrounding the wellbore.

The instants of emission of said waves are received on the drill-pipe sensor and then recorded whilst the first arrivals of direct elastic waves, after passing through the formations located between the bottom of the wellbore and the surface, are received on the ground sensors and recorded. The recordings of these different instants serve to calculate the travel times of the waves which propagate within the formation or formations and within the string of drill pipes.

Starting from a certain number of known parameters, the position of the bit is deduced by solving a system of equations given in U.S. Pat. No. 3,739,871.

It is also specified in these U.S. patents that the recordings of the first arrivals are employed for calculating the mean velocities of the elastic waves which propagate within the subsurface formation or formations.

From an analysis of these patents, it is permissible to state that the log considered here is instantaneous since the measurements are performed while drilling of the borehole is in progress.

However, processing of the recorded signals when considering U.S. Pat. No. 3,739,871 which is mentioned as forming an integral part of U.S. Pat. No. 3,817,345 and 4,003,017, relates to the precise determination of the instants of emission and the difference in travel times of the elastic waves which propagate along two distinct paths. As in conventional well logs, a listening time is necessary between two acoustic emissions since it would otherwise be impossible to establish a separation between the first direct arrivals and the second arrivals caused by reflection of the waves from the reflectors located at the interfaces of geological formations.

In the final analysis, this is a non-continuous method in which two consecutive instants of emission of elastic waves are separated by a listening time which must be at least equal to the time of travel along the single path followed by said waves between the transmission means and the ground sensors.

It must also be noted that the method described in this prior art makes use of a pulse-type method since a pulse is emitted at each falling movement of the upper portion of the drill-pipe or of the bit and produces the conventional waves which are recorded in the form of electric signals after reception on the drill-pipe sensor and the ground sensors.

Finally, in U.S. Pat. No. 3,739,871 which relates to processing of the signals, it is stated that the recordings associated with the ground sensors can be added after setting with respect to a time origin in order to display one and the same event received on the ground sensors and in order to improve the signal-to-noise ratio.

Among the disadvantages attached to the devices and the method described in these patents should be mentioned the fact that it is necessary to interrupt the drilling operation from time to time in order to generate elastic waves and especially the fact that consideration is given only to the first arrivals, thus disregarding the large number of reflections from the different reflectors. In fact, the only wave which is given preference is the compressional wave or P wave whereas current researches all bear witness to the fact that the shear waves or S waves are also highly important for a better knowledge of subsurface characteristics.

The object of the present invention is to propose a method in which the drilling tool or more precisely the bit as defined earlier constitutes an acoustic-wave source and which utilizes the signals produced by abrasion or destruction of the rock so that, after reception on judiciously arranged sensors and processing of the received signals, it is possible to obtain data similar to those supplied by the acoustic logs and measurements of seismic type within the well-bores.

In order to achieve this aim in particular, the present invention has for its object a method of instantaneous well-logging within a wellbore of the type in which it consists in recording in the form of signals elastic waves produced by the lower portion of a drilling tool for disintegrating rocks within the wellbore, a first series of waves propagated within said drilling tool being received on at least a first sensor mounted at the upper end of said drilling tool in order to produce at least a first recording designated as a drill-pipe recording whilst a second series of waves propagated from the lower portion of the drilling tool to the ground surface face of the wellbore and through the ground strata surrounding said wellbore is received at least a second sensor in order to produce at least a second recording designated as a ground recording, characterized in that it consists in locating on each of said first and second recordings the portions of signals corresponding to one and the same position of the lower portion of the tool within the wellbore, each of said portions thus constituting elementary recordings; in that it consists in grouping the elementary recordings in pairs, each pair comprising a drill-pipe elementary recording and a ground elementary recording, then in intercorrelating the elementary recordings of each pair between each other in such a manner as to produce for each pair a correlated signal which is representative of the acoustic energy generated by the lower portion of the drilling tool and of the difference in times of travel of the waves received on the sensors from which the pair of recordings has been obtained.

One advantage of the present invention lies in the fact that it is possible to estimate in real time, by means of the drill-pipe and ground recordings, the acoustic characteristics of the formations being traversed, the visual comparison of the two recordings being intended to permit a first survey of the nature of the formations being traversed.

Quite clearly, the important requirement is to determine the characteristics of each formation being traversed. The data which are necessary for this purpose are supplied by the correlated signals which are representative of the selected portions of elementary recordings.

In accordance with another characteristic feature, the method further consists in determining, in respect of each position considered of the lower portion of the tool within the well, the travel time of the waves which propagate between the lower portion of the tool and the sensor which is mounted at the upper end of said drilling tool, then in shifting the correlated signal corresponding to the position considered by a quantity equal to said travel time as thus determined.

This makes it possible to reset the two recordings with respect to each other in order to put the same recorded events in phase and in order to make it possible to obtain in respect of each event a correlation peak which is relatively high with respect to the correlation residues.

In accordance with another characteristic feature, the drill-pipe recording is subjected to a pretreatment which consists in eliminating secondary events in order to retain on said recording only principal events of interest.

The parasitic effect on measurement of time intervals of correlation peaks as a result of stabbing of drill-pipe sections while drilling is in progress is accordingly eliminated by determination of the wave propagation time in the drill string. This propagation time can be determined by various methods which are mentioned in the description and the claims.

Further advantages and characteristics will become apparent from a perusal of the description of a method in accordance with the invention which is given by way of indication but not in any limiting sense, as well as the accompanying drawings, in which:

FIG. 1 is a diagrammatic sectional representation of the subsurface formations and of the means employed in the method in accordance with the invention.

FIG. 2 is a diagrammatic and expanded representation of a portion of recording of the signal received on a geophone and resulting from emission of an elementary pulse by the bit.

FIGS. 3a and 3b are, in respect of a given depth, simulated representations of portions of recording of signals received respectively on a sensor mounted on the drilling tool and on a geophone whilst FIG. 3c is the result of correlation of the recording segments shown in FIGS. 3a and 3b.

FIGS. 4a to 4c are similar to FIGS. 3a to 3c at the same given depth but after stabbing of a drill-pipe section in the string of drill-pipes of the drilling tool.

FIG. 5 is a very diagrammatic representation of a seismic well profile as obtained in accordance with the invention.

Figure 6:
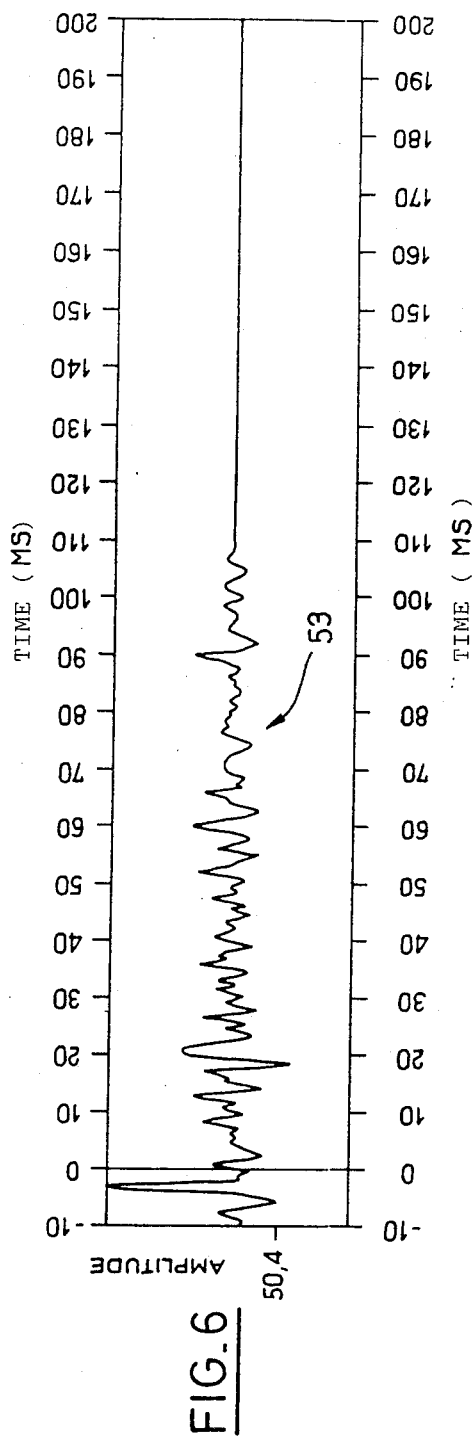
FIG. 6 is the result of correlation of the two intercorrelation functions shown in FIGS. 3c and 4c.

In a subsurface formation 1 materialized by the surface 2, as shown in FIG. 1 a wellbore 3 is drilled by means of a derrick 4. A drilling tool represented diagrammatically by a string of drill-pipes 5 and a drilling bit 6 is also shown within the wellbore 3 as well as a drill-pipe sensor 7 mounted on the upper portion of the drill string 5 above the rotary table or in other words above the surface 2. Sensors 8, 9 such as geophones are located on the surface 2 in suitable directions as a function of the results which are sought. For the sake of greater convenience in the explanations which now follows, the geophones 8 and 9 are shown on each side of the wellbore 3 but can also be located on the same side in all cases. The sensor 7 and the geophones 8, 9 are connected by means of conductors 10 to 12 or by telemetering to an amplifier 13 connected to a recorder 14 which may or may not be equipped with display means.

The drilling bit 6, for example of the type comprising cutting rollers, is well-known to drillers and will therefore not be described in detail. The rotation-percussion of the bit 6 on the rock of the bottom of the borehole 3 generates elastic waves which propagate continuously, or at least during operation of said bit 6, along two principal paths.

The first path is constituted by the drill string 5 and the signal received on the sensor 7 which can be an accelerometer, a velocimeter or any other suitable type of transducer, is recorded on the recorder 14 after amplification. In respect of a given position of the bit 6 within the wellbore 3, that is to say at a certain depth within the wellbore 3, the characteristics of the signal received on the sensor 7 do not vary to a great extent and can be considered as a reference of the vibrations emitted by the drilling bit 6. For the sake of greater convenience, the different positions of the bit 6 within the borehole 3 will be defined by the term level. Thus in FIG. 1, the drilling bit 6 in the upper position is said to be at the level $Z_1$ whilst $Z_4$ is the level of the bit 6 in the lower position, at a greater depth than the upper position.

On a recorder 14' which is either separate or integrated in the recorder 14, the level of the bit 6 is recorded as a function of the time given, for example, in minutes.

The second path is constituted by the formation or formations being traversed and located between the drilling bit 6 and the ground surface 2.

Between the surface 2 and the level $Z_1$, it is assumed that the formation is homogeneous and nearly isotropic or at any event that it is not provided with a reflector whereas two reflectors $R_1$ and $R_2$ are located at the levels $Z_2$ and $Z_3$.

The vibrational energy transmitted to the geophone 9 by the bit 6 at the level $Z_1$ which is in this case considered as a seismic source is capable of following at least three different acoustic-wave paths, for example. The first acoustic-wave path 15 is direct and corresponds to a first arrival on the geophone 9. The second acoustic-wave path 16 terminates at the same geophone 9 after reflections from the reflectors $R_1$ and $R_2$. The third acoustic-wave path 16a terminates at the same geophone 9 after a single reflection from the reflector $R_1$. The instants of recording of the signals produced by the elastic waves which propagate along one of the acoustic-wave paths 15, 16, 16a will be displaced in time to a greater or lesser extent according to the number of reflections which occur in these paths. In FIG. 2, there has been shown a theoretical trace on which is distinguished a first peak 17 recorded at the instant $T_1$ corresponding to the travel time taken by an elastic wave along the direct path 15; the peak 17 is therefore the first arriving event.

The second arriving event 18 takes place at another instant $T_2$ and corresponds to an acoustic-wave path of travel after a single reflection of said wave from the reflector $R_1$ along the acoustic-wave path 16a.

The signal received on the geophone 8 in respect of the level $Z_4$ of the bit 6 is also capable of following at least two different acoustic-wave paths, for example, in one case the direct path 19 and in the other case the path 20 after reflections from the reflectors $R_1$ and $R_2$.

One step of the method in accordance with the invention consists in simultaneously recording either in continuous or non-continuous operation the signals received on the one hand on the sensor 7 and on the other hand on the geophones 8, 9 while drilling of the borehole 3 is in progress as the bit 6 penetrates the formations.

On the raw recordings thus obtained, in which one corresponds to the sensor 7 and the other corresponds to the geophone 8 or 9, all the events are mixed whether they are characteristic or not and could not be dissociated without a special treatment, which constitutes another original step of the method in accordance with the invention.

In fact, on a real raw recording which extends over a period of several hours, it is impossible to distinguish the first arriving events at the levels $Z_1, Z_2 \ldots Z_n$, and even less the second arriving events produced by the reflections.

In FIG. 3a, there has been shown the raw recording of the amplitude of part of a signal 30 received on the sensor 7 as a function of time measured in milliseconds at a level of 36 m of the drilling bit 6 and a length Li of the string of drill-pipes. Events 31, 32, 33 and 34 appear more or less clearly on the recording 30.

In FIG. 3b, there has been shown the raw recording of the amplitude of part of a signal 35 received on the geophone 8, 9 as a function of time measured in milliseconds and under the same conditions as those of FIG. 3a. Similarly, a visual inspection detects events 36 to 39 which appear to correspond to the events 31 to 34 but does not make it possible to draw a sharp distinction between the arriving events caused by reflections from the reflectors.

The second step in accordance with the method of the invention consists in selecting from the raw recordings 30 and 35 recording portions or windows corresponding to one and the same depth level of the drilling bit 6, namely 36 m in the examples shown, then in intercorrelating said windows in such a manner as to dissociate the events from each other. The result (FIG. 3c) is a primary intercorrelation function 40 which comprises four principal peaks 41 to 44, the amplitudes of which are high with respect to those of the correlation residues. The first peak 41 corresponds to a direct arrival whereas the peaks 42 to 44 correspond to arrivals of the waves reflected from reflectors. In the example given and with reference to FIG. 5, it is observed that the peak 42 separated from the peak 41 by 28 ms corresponds to a wave reflected from a reflector located at 60 m, the peak 43 being at 68 ms from the peak 41 and corresponding to a reflection from a reflector located at 120 m, whilst the peak 44 is at 98 ms from the peak 41 and corresponds to a reflection from a reflector located at 180 m.

The length of the window of the raw recording 30 can be equal to or different from that of the window of the raw recording 35. It is also possible to adopt windows which overlap each other.

The selection of windows to be intercorrelated is carried out as follows in respect of one and the same depth level of the drilling bit.

In view of the fact that the recordings of the signals received on the sensor 7 and the geophones 8, 9 have the same time origin and the same graduation which can be in milliseconds, in seconds or any other time unit, the beginning of the windows is selected arbitrarily, for example 3 hours after commencement of recordings. Reference is then made to the recording of the bit depth level as a function of time in order to determine the bit level corresponding to this time-delay of 3 hours.

The level Z and the beginning of the windows being defined, there are selected, within windows having substantial lengths for which it may be considered that the bit level Z has practically not varied, smaller windows having lengths of a few seconds or tens of seconds such as 50 seconds, for example. These windows having shorter lengths are employed for the correlation operations, the results of which are similar to that shown in FIG. 3c, are then summated in order to enhance the characteristic events 41 to 44 and to obtain a sum trace corresponding to a horizontal line of FIG. 5 having a level Z on which the time in milliseconds is plotted as abscissae and the depth in meters is plotted as ordinates.

It follows from the foregoing that processing of the signals recorded in the form of raw recordings in the recorder 14 therefore consists in identifying on the raw recordings the segments of the recordings which correspond to one and the same bit level, then in choosing correlation portions or windows from said recording segments in order to constitute pairs of recordings designated as elementary recordings, then in intercorrelating the elementary recordings such as 30 and 35 shown in FIGS. 3a, 3b and producing in respect of each pair an intercorrelation function similar to that of FIG. 3c which is representative of the acoustic energy emitted by the bit 6 and of the difference in travel times of the elastic waves received on the sensor 7 and the geophones 8, 9 respectively.

The travel times of the waves within the drilling tool are represented in FIG. 5 by the stairstep line 45, in which each stairstep interval B, C, D ... J corresponds to the addition of a new drill-pipe section in the string of drill-pipes 5. The negative stairstep interval A takes into account the fact that the sensor 7 is not at the level of the ground surface 2 but above, as is apparent from FIG. 1. The distance between the axis of ordinates which gives the depth in meters from the line 45 represents the travel time of the waves which are produced by the bit 6 and propagate within the string of drill-pipes 5.

The distance $T_B$ corresponds to the first addition or stab of a drill-pipe section in the drill string and represents the travel time of the acoustic waves within said added drill-pipe section.

The distance $T_C$ is equal to the distance $T_B$ plus the stairstep interval $C_1C_2$ which corresponds to a second addition of a drill-pipe section. Since the length of each added drill-pipe section is constant such as 18 m, for example, it is normal to observe that the stairstep interval C is equal to the interval B subject to any errors which may be introduced by the joints between drill-pipes. In consequence, the travel time $T_C$ of the acoustic waves within the drill string is equal to the travel time $T_B + C_1C_2$.

Similarly, the travel time at the stairstep interval D is $T_D = T_C + D_1D_2$ and so on in sequence for the other stairstep intervals.

Since the sums of the primary intercorrelation functions relating to each depth level of the drilling bit can have different time origins, it is necessary to set or locate them with respect to a common time origin. In accordance with the invention, the sums of the primary intercorrelation functions are set with respect to the theoretical instant O which would be obtained if the sensor 7 were located on the bit 6.

To this end, the method consists of adding to the travel-time difference in the sum of primary intercorrelation functions corresponding to each level a time which is equal to the travel time of the waves within the drill string in respect of the level considered.

Referring again to FIG. 5, it is apparent that the signal correlated in respect of the level of 80 m will have to be shifted by $T_D = 9$ ms whereas the signal correlated in respect of the level of 180 m will have to be shifted by $T_J = 25$ ms.

It is important to determine only the time of propagation within the drill string in respect of each level considered for the purpose of setting the sums of the primary intercorrelation functions.

A number of methods for determination of propagation times within the drill string can be employed.

One of these methods is based on the assumption that the drill string is homogeneous irrespective of its length. Under these conditions the velocity of propagation of a wave is determined within one element of the drill string outside the wellbore. The velocity and length of the drill string having thus been determined in respect of a given level of the bit 6 within the borehole, the time of propagation of the waves from said bit to the sensor 7 is calculated.

Another method consists of producing a shock impact within the drill string from the surface 2 or at the level of the sensor 7 at each addition of a drill-pipe section and in measuring on the sensor 7 or by means of another sensor the propagation time of the shock wave on an outward and return path, that is to say after reflection from the bit 6. The single-trip propagation time is accordingly deduced therefrom.

The first method is approximate since it does not take into account the changes which may appear in the structure of the drill string and which are due in particular to variations in diameter at the coupling elements between the different drill-pipe sections.

The second method which has the advantage of being performed in situ requires an additional operation since it is necessary to produce a shock impact each time a drill-pipe section is added.

The present invention proposes to provide an original solution to this problem of measurement in situ of the time of propagation of a wave within the drill string while drilling of the wellbore is in progress.

In accordance with another characteristic feature of the invention, the measurement of the travel times $T_B$ to $T_J$ (FIG. 5) is obtained by a particular treatment of the primary intercorrelation functions or of their sums.

One example of measurement of the travel times will be given solely in respect of the stairstep interval B since it should be pointed out that the same procedure will be adopted for the other stairstep intervals C to J.

When the drilling bit reaches the depth level of 36 m, a new drill-pipe section is added. The length of the drill string which was Li prior to adding the pipe section is increased by a quantity $\Delta L$ equal to the length of the new pipe-section thus added, namely 18 m, and becomes $Li + \Delta L$. However, the bit 6 is still at the level of 36 m when it operates again, thus generating another series of random pulses which give rise to elastic waves received on the sensor 7 and the geophones 8, 9.

The raw-record segments 50 and 51 of the sensor 7 and of the geophones 8, 9 are represented in FIGS. 4a and 4b in respect of the depth level of 36 m but after addition of an 18 m drill-pipe section, that is to say in respect of the length $Li + \Delta L$ of the drill string 5. FIG. 4c represents the primary intercorrelation function 52 which is the product of correlation of the signals of the records 50 and 51.

Thus in the raw record of the sensor 7, it is possible to determine in respect of the level of 36 m the record segments 30 and 50 corresponding to the lengths Li and $Li + \Delta L$ respectively. Similarly, in the raw record of the geophone 8, 9, it is possible to determine in respect of the same level of 36 m the record segments corresponding to the lengths Li and $Li + \Delta L$. But in the last-mentioned case, the acoustic-wave path from the bit 6 to the geophones 8, 9 has practically not varied.

One step in accordance with the method consists in intercorrelating the segment 30 of the raw record of the sensor 7 in respect of the length Li with the segment 35 of the raw record of the geophone 8, 9 in respect of the same length Li and in intercorrelating the raw-record segment 50 of the sensor 7 in respect of the length $Li + \Delta L$ with the segment 51 of the raw record of the geophone 8, 9 in respect of the same length $Li + \Delta L$. There are then obtained two primary intercorrelation functions 40 and 52 corresponding to the points $B_1$ and $B_2$ respectively (FIG. 5).

The next step consists in intercorrelating these two primary intercorrelation functions, the result of which is a secondary intercorrelation function 53 characterized by a difference in travel time $\Delta T$ which is precisely the travel time $B_1 B_2$ of the waves within the added drill-pipe section. This secondary intercorrelation function 53 is represented in FIG. 6 and the measured value $\Delta T$ is of the order of 3 ms.

In successive stages, the travel times $C_1 C_2$ to $J_1 J_2$ are determined for setting with respect to the theoretical instant O.

In the description, reference has been made to the geophones 8, 9 without distinction since each geophone receives all the elastic waves produced as a result of the vibrational energy emitted by the drilling bit, subject to attenuations. The geophones 8, 9 can be more numerous and placed on the ground surface 2 in a predetermined geometry which makes it possible in addition to determine the coordinates of the bit 6 while drilling of the borehole is in progress.

The seismic borehole profile which is obtained in accordance with the invention is simulated in FIG. 5 in which the continuous line 60 which slopes downwards from left to right corresponds to the first arriving waves (direct arrivals) on the geophones 8, 9 whilst the continuous lines 61, 62, 63 which slope downwards from right to left correspond to the single reflected arrivals.

It can readily be seen that the points of junction of the lines 61 to 63 with the line 60 determine the exact position of the different subsurface reflectors. Thus the junction point 64 defines a reflector $64_R$ located at the level $60m$ whilst the junction points 65 and 66 define reflectors $65_R$ and $66_R$ located respectively at the levels 120 and 180 m.

The method in accordance with the invention makes it possible to obtain sharper and more accurate seismic profiles than with the well-logging methods of the prior art, especially within the lithologic strata which are close to the ground surface and in which the noise level is very high. In the case of conventional methods, the results begin to be conclusive only above 120 ms and therefore when the drilling depth has attained a few hundred meters.

The advantage of the present invention is therefore considerable not only for the control of drilling operations as a result of better real-time determination of interfaces or reflectors which succeed each other within the subsurface but also in regard to the physical characteristics of the lithologic strata traversed by the wellbore.

The present invention can also be utilized for the determination of transit times between two relatively close depth levels of the order of a few tens of centimeters.

To this end, there are employed the sums of primary intercorrelation functions which correspond to these two depth levels and in which only those portions relating to the first arriving events are intercorrelated. The abscissa of the maximum value of the tertiary intercorrelation function thus obtained is representative of the transit time of the acoustic wave within the portion of terrain between said levels. However, it should be noted that these data are obtained in real time, contrarily to the methods of the prior art.

It is readily apparent that certain geophones 8 and 9 can be on the ground surface 2 and others placed in another wellbore which is separate from the wellbore 3. This makes it possible to determine the travel time of the waves which propagate between the two wellbores, thus making it easier to identify geological formations located between the wellbores.

It should clearly be understood that the invention is not limited in any sense to the embodiments of the example described and illustrated, and extends to many alternative embodiments within the capacity of those versed in the art, depending on the applications which are contemplated and without thereby departing from the scope of the invention.

We claim:

1. A method of instantaneous logging within a wellbore comprising the steps of:
    disintegrating rocks within the wellbore with a drilling tool so that elastic waves are produced by the lower portion of said drilling tool;
    receiving a first series of waves propagated within said drilling tool on at least a first sensor mounted at the upper end of said drilling tool in order to produce at least a first recording designated as a drill-pipe recording;

receiving a second series of waves propagated from the lower portion of said drilling tool to the ground surface of the wellbore and through the ground strata surrounding the wellbore on at least a second sensor in order to produce at least a second recording designated as a ground recording;

locating on each of said first and second recordings the portions of signals corresponding to one and the same position of the lower portion of the tool within the wellbore, each of said portions thus constituting elementary recordings;

grouping the elementary recordings in pairs, each pair comprising a drill-pipe elementary recording and a ground elementary recording;

intercorrelating the elementary recordings of each pair with each other, wherein for each pair a correlated signal is produced which is representative of the acoustic energy generated by the lower portion of the drilling tool and of the difference in travel times of the waves received on the sensors from which the pair of recordings has been obtained;

determining with respect to each position of the lower portion of the tool within the wellbore, the travel time of the waves which propagate between the lower portion of the tool and the sensor which is mounted to the upper end of said drilling tool, said travel time being determined from a measurement of the velocity of propagation of a vibration within the drilling tool when it is stationary; and shifting the correlated signal corresponding to the position of the lower portion of the tool by a quantity equal to said travel time.

2. A method according to claim 1, wherein a number of ground recordings are produced from a number of sensors arranged at the surface in accordance with at least one predetermined geometry.

3. A method of instantaneous logging within a wellbore, comprising the steps of:

disintegrating rocks within the wellbore with a drilling tool whereby elastic waves are produced by the lower portion of said drilling tool;

receiving a first series of waves propagated within said drilling tool on at least a first sensor mounted at the upper end of said drilling tool in order to produce at least a first recording designated as drill-pipe recording;

receiving a second series of waves propagated from the lower portion of said drilling tool to the ground surface of the wellbore and through the ground strata surrounding the wellbore on at least a second sensor in order to produce at least a second recording designated as a ground recording;

locating on each of said first and second recordings the portions of signals corresponding to one and the same position of the lower portion of the tool within the wellbore, each of said portions thus constituting elementary recordings;

grouping the elementary recordings in pairs, each pair comprising a drill-pipe elementary recording and a ground elementary recording;

intercorrelating the elementary recordings of each pair with each other, wherein for each pair a correlated signal is produced which is representative of the acoustic energy generated by the lower portion of the drilling tool and of the difference in travel times of the waves received on the sensors from which the pair of recordings has been obtained;

determining with respect to each position of the lower portion of the tool within the wellbore, the travel time of the waves which propagate between the lower portion of the tool and the sensor which is mounted to the upper end of said drilling tool, said travel time being determined from the primary recordings of the drill-pipe sensor prior to and after adding a drill-string element, said primary recordings being such as to correspond substantially to the same depth of the drill tool; and shifting the correlated signal corresponding to the position of the lower portion of the tool by a quantity equal to said travel time.

4. A method according to claim 3, wherein a number of ground recordings are produced from a number of sensors arranged at the surface in accordance with at least one predetermined geometry.

5. A method of instantaneous logging within a wellbore comprising the steps of:

disintegrating rocks within the wellbore with A drilling tool whereby elastic waves are produced by the power portion of said drilling tool;

receiving a first series of waves propagated within said drilling tool on at least a first sensor mounted at an upper end of said drilling tool in order to produce at least a first recording designated as a drill-pipe recording;

receiving a second series of waves propagated from a lower portion of said drilling tool to the ground surface of the wellbore and through the ground strata surrounding the wellbore on at least a second sensor in order to produce at least a second recording designated as a ground recording;

locating on each of said first and second recordings the portions of signals corresponding to one and the same position of the lower portion of the tool within the wellbore, each of said portions thus constituting elementary recordings;

grouping the elementary recordings in pairs, each pair comprising a drill-pipe elementary recording and a ground elementary recording;

intercorrelating the elementary recordings of each pair with each other, wherein for each pair a correlated signal is produced which is representative of the acoustic energy generated by the lower portion of the drilling tool and of the difference in travel times of the waves received on the sensors from which the pair of recordings has been obtained;

determining, with respect to each position of the lower portion of the tool within the wellbore, the travel time of the waves which propagate between the lower portion of the tool and the sensor which is mounted to the upper end of said drilling tool, said travel time being determined from waves produced by a shock impact within the drilling tool; and shifting the correlated signal corresponding to the position of the lower portion of the tool by a quantity equal to said travel time.

6. A method according to claim 5, wherein a number of ground recordings are produced from a number of sensors arranged at the surface in accordance with at least one predetermined geometry.

7. A method of instantaneous logging within a wellbore comprising the steps of:

disintegrating rocks within the wellbore with a drilling tool whereby elastic waves are produced by a lower portion of said drilling tool;

receiving a first series of waves propagated within said drilling tool on at least a first sensor mounted at an upper end of said drilling tool in order to produce at least a first recording designated as a drill-pipe recording;

receiving a second series of waves propagated from the lower portion of said drilling tool to the ground surface of the wellbore and through the ground strata surrounding the wellbore on at least a second sensor in order to produce at least a second recording designated as a ground recording;

locating on each of said first and second recordings the portions of signals corresponding to one and the same position of the lower portion of the tool within the wellbore, each of said portions thus constituting elementary recordings;

grouping the elementary recordings in pairs, each pair comprising a drill-pipe elementary recording and a ground elementary recording;

intercorrelating the elementary recordings of each pair with each other, wherein for each pair a correlated signal is produced which is representative of the acoustic energy generated by the lower portion of the drilling tool and of the difference in travel times of the waves received on the sensors from which the pair of recordings has been obtained, the elementary recordings of each pair being correlated in segments to obtain different intercorrelation functions;

summing the different intercorrelation functions, the sums of the intercorrelation functions corresponding to two predetermined depth levels are intercorrelated, the abscissa of the maximum value of the intercorrelation function thus obtained being representative of the transit time of the acoustic wave within that portion of the terrain which is located between said levels.

8. A method according to claim 7, wherein the portions of the sums of the intercorrelation functions relating to the first arrivals of the acoustic wave are chosen so as to perform the intercorrelation.

9. A method according to claim 8, wherein a number of ground recordings are produced from a number of sensors arranged at the surface in accordance with at least one predetermined geometry.

* * * * *